(12) United States Patent
van der Vlugt et al.

(10) Patent No.: US 10,580,403 B2
(45) Date of Patent: Mar. 3, 2020

(54) METHOD FOR CONTROLLING OPERATION OF AN AGRICULTURAL MACHINE AND SYSTEM THEREOF

(71) Applicant: Kverneland Group Mechatronics B.V., Nieuw-Vennep (NL)

(72) Inventors: Peter van der Vlugt, Hoofddorp (NL); Shay Navon, Kiryat Ata (IL)

(73) Assignee: Kverneland Group Mechatronics B.V., Nieuw-Vennep (NL)

( * ) Notice: Subject to any disclaimer, the term of this patent is extended or adjusted under 35 U.S.C. 154(b) by 214 days.

(21) Appl. No.: 15/194,822

(22) Filed: Jun. 28, 2016

(65) Prior Publication Data

US 2017/0004830 A1 Jan. 5, 2017

(30) Foreign Application Priority Data

Jul. 1, 2015 (EP) ..................................... 15174840

(51) Int. Cl.
*G10L 15/22* (2006.01)
*A01B 69/00* (2006.01)
(Continued)

(52) U.S. Cl.
CPC .............. *G10L 15/22* (2013.01); *A01B 69/00* (2013.01); *A01B 76/00* (2013.01); *G05D 1/0016* (2013.01);
(Continued)

(58) Field of Classification Search
CPC ......... A01B 69/00; A01B 76/00; E02F 9/205; G05D 1/0016; G05D 2201/0201; G10L 15/22; G10L 2015/221; G10L 2015/223
See application file for complete search history.

(56) References Cited

U.S. PATENT DOCUMENTS

| 2002/0152079 A1 | 10/2002 | Furuta | |
|---|---|---|---|
| 2004/0193420 A1* | 9/2004 | Kennewick | ....... G06F 17/30654 704/257 |
| 2007/0073469 A1* | 3/2007 | Watanabe | ............... F02N 11/08 701/113 |

FOREIGN PATENT DOCUMENTS

| DE | 10217398 A1 * | 1/2003 | ............. G08C 17/02 |
|---|---|---|---|
| DE | 10217398 A1 | 1/2003 | |

(Continued)

OTHER PUBLICATIONS

European Office Action pertaining to Application No. EP 15 174 840.7, filed Mar. 17, 2017.

*Primary Examiner* — Charles J Han
(74) *Attorney, Agent, or Firm* — Dinsmore & Shohl, LLP (57) ABSTRACT

A method for controlling operation of an agricultural machine and system thereof are disclosed. The method may comprise providing a portable device that has an input device, a processing unit, a storage unit, an output device, and a transceiver device configured for wireless data transmission; receiving a voice control command over a microphone device of the input device of the portable device; determining command text data from the voice control command by processing the voice control command by a speech recognition application running on the processing unit of the portable device; providing machine control signals assigned to a machine control function in a control device of an agricultural machine located remotely from the portable device; and controlling the operation of the agricultural machine according to the machine control signals.

12 Claims, 4 Drawing Sheets

(51) Int. Cl.
   *A01B 76/00* (2006.01)
   *G05D 1/00* (2006.01)
   *E02F 9/20* (2006.01)

(52) U.S. Cl.
   CPC ...... *E02F 9/205* (2013.01); *G05D 2201/0201* (2013.01); *G10L 2015/221* (2013.01); *G10L 2015/223* (2013.01)

(56) References Cited

FOREIGN PATENT DOCUMENTS

| | | |
|---|---|---|
| DE | 102004032642 A1 | 2/2006 |
| EP | 1529428 A1 | 5/2005 |
| JP | 2000355484 A | 12/2000 |

\* cited by examiner

METHOD FOR CONTROLLING OPERATION OF AN AGRICULTURAL MACHINE AND SYSTEM THEREOF

TECHNICAL FIELD

The present disclosure refers to a method for controlling operation of an agricultural machine and a system thereof.

BACKGROUND

In operation, functions of an agricultural machine may be controlled by a control device connected on one side to devices provided on the agricultural machine and on the other side to one or more user input devices. The operator of the agricultural machine may provide a user input to the input device. The input device, for example, may be a touch pad or a joystick. In response to the user input, in the control device, based on the user input control signals are generated which are assigned to a control function of a device of the agricultural machine. Following, operation of the device of the agricultural machine is controlled. The input device, the control device, and the device(s) of the agricultural machine may be connected to a common data bus system, for example the so-called ISOBUS (e.g., in a version ISO 11783) which is a communication protocol for the agriculture industry based on the SAE J1939 protocol.

Document DE 10 2004 032 642 A1 refers to an agricultural machine comprising an electronic control device, the electronic control device having a speech recognition system.

Document US 2002/0152079 A1 refers to a voice-actuated body control apparatus for a construction machine. The voice-actuated machine body control apparatus comprises speech recognition means capable of speech-recognizing a voice command representative of an instruction by voice regarding a movement of a machine body, machine body control means capable of controlling the machine body movement based on a result of the recognition by the speech recognition means, obstacle recognition means capable of detecting the presence of an object outside the machine body which may possibly make an obstacle to the machine body movement, and avoidance means capable of inhibiting, when the presence of an object outside of the machine body is detected by the obstacle recognition means, the machine body movement in accordance with the voice command preferentially to the control by the machine body control means thereby to avoid an inappropriate movement of the machine body.

Document EP 1 529 428 A1 discloses a method and a system for automatic steering of an agricultural machine.

In document JP 2000-355484 voice recognition means are disclosed, the voice recognition means recognizing a motion order word responding to respective operation instruments of a working machine from the voice issued by an operator.

SUMMARY

The present disclosure provides details concerning a method for controlling operation of an agricultural machine and a system thereof, which allow for improved remote control of the agricultural machine.

According to an aspect, a method for controlling operation of an agricultural machine is discussed. According to the method, a portable device is provided, the portable device comprising an input device, a processing unit, a storage unit, an output device, and a transceiver device configured for wireless data transmission. For example, the portable device may be a mobile phone, a laptop computer or a tablet computer. Over a microphone device of the input device of the portable device a voice control command is received. From the voice control command, text data are determined by processing the voice control command by a speech recognition application running on the processing unit of the portable device. In general, speech recognition applications for which different types are known as such provide for translating voice or speech messages into text data. The voice control command provided by a user or an operator of the agricultural machine is provided for controlling the operation of the agricultural machine. Specifically, a functional device of the agricultural machine may be controlled by the voice control command. The agricultural machine is located remotely from the portable device.

In the method, machine control signals assigned to a machine control function are provided in a control device of the agricultural machine in the location remote from the portable device. The control device of the agricultural machine comprises a processing unit and a transceiver device configured for wireless data transmission. The providing of the machine control signals in the control device comprises determining, from the command text data, control function data indicating the machine control function. The control function data are assigned to or are representing the machine control function. The control function data are processed for generating the machine control signals. The machine control signals provide for controlling the function of the agricultural machine according to the voice control command received in the portable device. The operation of the agricultural machine is controlled according to the machine control signals.

The agricultural machine may be of any type. All types of functions of the machinery may be controlled by technologies described.

Data are transmitted by means of wireless data transmission between the portable device and the control device of the agricultural machine, such data transmission being done over the transceiver device of the portable device and the transceiver device of the control device of the agricultural machine. Different transmission techniques may be used such as Bluetooth technology and Near Field Communication. In an embodiment, the wireless data transmission is done by using a wireless network different from the telephone network (mobile phone network) used for data transmission with the portable device in a phone operation mode, the phone operation mode being a mode of operation of the portable device for performing a telephone call.

Prior to providing the machine control signals, the user or operator may be asked for confirmation whether the voice control command received over the microphone device of the portable device is correctly recognized by the speech recognition application running on the processing unit of the portable device.

The method may further comprise: outputting the command text data over a display of the output device of the portable device; outputting a request for a user input over the output device of the portable device; in response to the outputting of the command text data and the request for the user input, receiving a user confirmation input confirming that the command text data were correctly determined from the voice control command; and prior to providing the machine control signals, determining whether the user confirmation input was received. The command text data determined by the speech recognition application in the portable device are presented to the user or operator. The user is requested to confirm by a user input whether the voice control command is correctly recognized. If this is not the case, the user may be asked to repeat the voice control command. Again, the voice control command is received in the portable device and a confirmation request is outputted. In addition or as an alternative, a user text correction input may be received in the portable device in response to outputting the command text data over the display of the output device. Thereby, the user may correct the command text data provided by the speech recognition application in the portable device.

The method may further comprise: outputting voice data over a speaker device of the output device, the voice data being a voice representation of the command text data; outputting a request for a user input over the output device of the portable device; in response to the outputting of the voice data and the request for the user input, receiving a user confirmation input confirming hat the voice data correctly represent the voice control command; and, prior to providing the machine control signals, determining whether the user confirmation input was received. The voice data outputted over the speaker of the output device may be provided in the portable device by recording the voice control command received over the microphone of the input device. The recorded voice control command may be processed for improving data recognition quality. Such processed recorded voice data may be outputted over the speaker for requesting user confirmation with regard to the voice data correctly representing the recorded voice control command. Improvement of the recording quality can be done by a software application running on the processing unit of the portable device. Such recording optimization applications are known as such in the art.

The providing of the machine control signals assigned to the machine control function comprising determining and processing the control function data may be performed in the portable device and/or the control device of the agricultural machine. Depending on which component, namely the processing unit of the portable device and the control device of the agricultural machine, is used for performing certain steps, the operation of the system comprising the portable device and the agricultural machine will be different. The different operation modes provide for adjustment of the system for different field or use environment.

The method may further comprise: transmitting the command text data from the portable device to the control device of the agricultural machine by wireless data transmission; and, in the control device of the agricultural machine, determining the control function data from the command text data, and processing the control function data for generating the machine control signals in the control device of the agricultural machine. In this embodiment, after determining the command text data by the speech recognition application the portable device, the command text data are transmitted from the portable device to the control device of the agricultural machine by wireless data transmission. Further processing of the command text data is done in the control device of the agricultural machine.

In an alternative embodiment, the method may further comprise: determining the control function data from the command text data in the control unit of the portable device; transmitting the control function data from the portable device to the control device of the agricultural machine by wireless data transmission; and processing the control function data for generating the machine control signals in the processing unit of the control device of the agricultural machine. Different from an embodiment described above, the control function data are determined from the command text data in the portable device. The control function data are transmitted from the portable device to the control device of the agricultural machine for further processing. The more functionalities are put into the control device of the portable device the less functionalities are needed in the control device of the agricultural machine which could lead into the use of smaller terminals in terms of hardware functionality.

The method may comprise, in the control unit of the portable device, determining the control function data from the command text data in the control unit of the portable device, and processing the control function data for generating the machine control signals in the processing unit of the portable device. The machine control signals are transmitted from the portable device to the control device of the agricultural machine by wireless data transmission. Different from at least some of the embodiments described above, the machine control signals may be generated in the portable device and transmitted to the control device of the agricultural machine where the control signals are used for controlling the agricultural machine, specifically, one or more functional elements or device of the agricultural machine.

The method may further comprise: starting a configuration mode of operation in the portable device; outputting audio and/or video information data over the output device of the portable device; the audio and/or video information data representing information about the machine control function; receiving a configuration user input over the input device of the portable device; the configuration user input comprising a new voice control command which is different from the voice control command and which, in a user defined configuration, is to be assigned to the machine control function; assigning the new voice control command to the machine control function, the assigning comprising processing the configuration user input and providing assignment data indicative of the assignment of the new voice control command to the machine control function in the processing unit of the portable device; and storing the assignment data in at least one of the storage unit of the portable device and a storage unit of the control device of the agricultural machine.

In an embodiment, the configuration mode of operation provides to the user or operator the option for generating a user defined configuration of the voice controlled system. For one or more machine control functions the user is allowed to define a user specific voice control command. In the configuration or set up mode of operation, the user defined voice control command is assigned to the machine control function selected by the user. Later in operation of the agricultural machine, the user can use the user defined voice control command for controlling the operation of the agricultural machine. The assignment of the new voice control command to the machine control function may be done by storing electronic information in at least one of the portable device and the control device of the agricultural machine, the electronic information indicating the assignment between the new voice control command received from the user in the portable device and the machine control function. When the new voice control command is assigned to the machine control function, the voice control command assigned to the machine control function before may be over written or deleted in the portable device and/or the control device of the agricultural machine.

After receiving a configuration user input and assigning the new voice control command to the machine control function, the recorded user voice input and/or the received user text input may be used for comparing such electronic information to the voice control command and the command text data, respectively, in the process of controlling the operation of the agricultural machine. The user voice input recorded may be translated into text data which may be mapped to the command text data derived from the received voice control command in the process of controlling the operation of the agricultural machine.

In the method, the receiving of the configuration user input may further comprise receiving at least one of a user voice input and a user text input over the output device of the portable device, and, if the user voice input is received, recording the user voice input in the portable device.

The recording of the user voice input may comprise mapping the user voice input to a plurality of standard voice user inputs and selecting one of the standard voice user inputs for recording. Instead of the recorded user voice input the standard voice user input selected in the mapping process may be used for further processing. For example, the standard voice user input may be outputted over the speaker device of the portable device in the process of requesting user confirmation. In response to receiving the configuration user input in the configuration or setup mode in the portable device, the user or operator may be requested to confirm correct recognition of the configuration user input in the portable device.

In an alternative embodiment, the method may further comprise: determining user command text data from the user voice input by processing the user voice input by the speech recognition application running on the processing unit of the portable device; outputting the user command text data over a display of the output device of the portable device; outputting a request for a user input over the output device of the portable device; in response to the outputting of the user command text data and the request for the user input, receiving a user confirmation input confirming that the user command text data were correctly determined from the user voice input; and, prior to assigning the new voice control command to the machine control function, determining whether the user confirmation input was received.

The method may comprise: generating translated voice data by a text-voice translation application running on the processing unit of the portable device, the translated voice data being a voice representation of the user text input; outputting the translated voice data over the speaker device of the output device; outputting a request for a user input over the output device of the portable device; in response to the outputting of the translated voice data and the request for the user input, receiving a user confirmation input confirming that the translated voice data were correctly generated from the user text input; and, prior to providing the machine control signals, determining whether the user confirmation input was received.

An alternative embodiment of the method, the following may be provided: outputting the recorded user voice input over the speaker device of the output device; outputting a request for a user input over the output device of the portable device; in response to the outputting of the recorded user voice input and the request for the user input, receiving a user confirmation input confirming that the recorded user voice input is correctly recorded; and, prior to providing the machine control signals, determining whether the user confirmation input was received.

According to yet another aspect, a system for controlling operation of an agricultural machine is discussed. According to the system, a portable device and an agricultural machine are provided. The portable device may have an input device, a processing unit, a storage unit, an output device, and a transceiver device configured for wireless data transmission. The agricultural machine is located remotely from the portable device. The agricultural machine may comprise a processing unit and a transceiver device configured for wireless data transmission, wherein the input device is configured to receive a voice control command over a microphone device of the input device. The processing unit is configured to determine command text data from the voice control command by processing the voice control command by a speech recognition application running on processing unit. The system is configured to provide machine control signals assigned to a machine control function in the control device of the agricultural machine, wherein the providing of the machine control signals comprises determining control function data indicating the machine control function from the command text data, and processing the control function data for generating the machine control signals, and control the operation of the agricultural machine according to the machine control signals.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
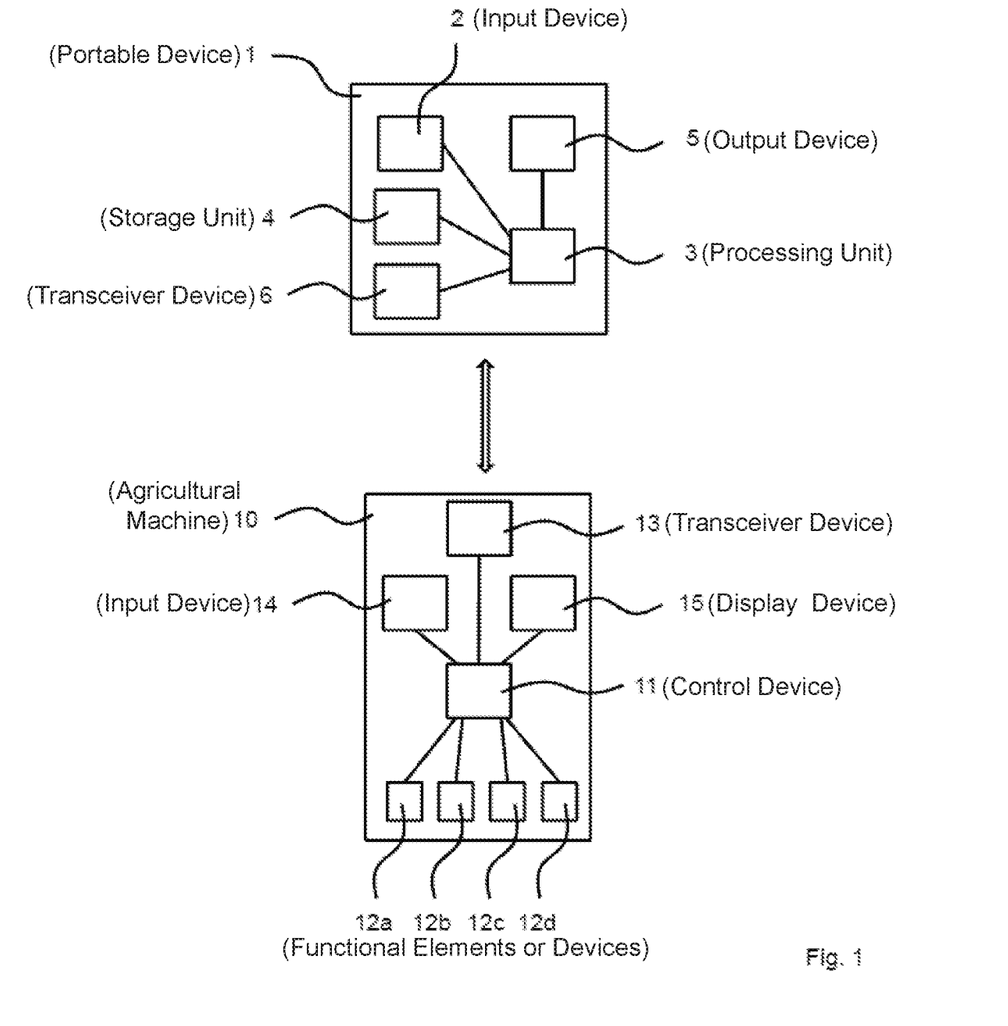
FIG. 1 depicts a block diagram of an embodiment of a system comprising a portable device and an agricultural machine.

FIG. 1 shows a schematic block diagram of a system comprising a portable device 1 and an agricultural machine 10. The portable device 1, for example, may be provided as a mobile phone, a tablet computer, or a laptop computer. The portable device 1 comprises functional elements or components: an input device 2, a processing unit 3, a storage unit 4, an output device 5, and a transceiver device 6. The transceiver device 6 is configured for wireless data transmission. The output device 5 may comprise at least one of a display device and a speaker device.

The agricultural machine 10 comprises a control device 11 connected to a plurality of functional elements or devices 12a, . . . , 12d of the agricultural machine 10. The functional elements 12a, . . . , 12d may be operated by control signals provided by the control device 11 during operation of the agricultural machine 10. The control device 11 is connected to or provided with a transceiver device 13. Also, the control device 11 is connected to an input device 14 and a display device 15.

The transceiver devices 6, 13 are configured for wireless data transmission between the portable device 1 and the agricultural machine 10. Specifically, if the portable device 1 is a mobile phone, for wireless data transmission a network is used which is different from the data transmission network used for transmitting telephone voice data. For example, the telephone voice data may be transmitted over a GSM (GSM—Global System for Mobile Communications) network. With regard to the data related to the voice control, technologies which may be used are, for example, Bluetooth or Near Field Communication.

Figure 2:
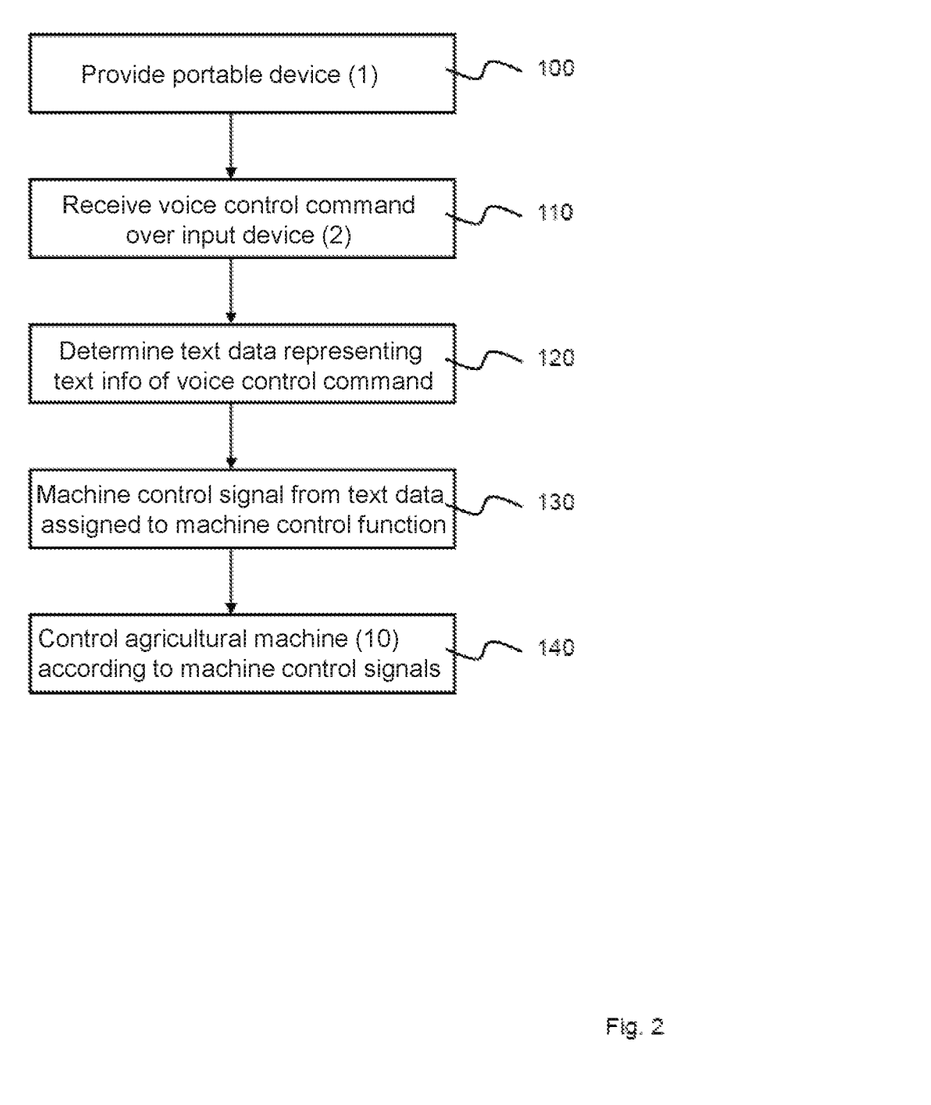
FIG. 2 depicts a block diagram for an embodiment of a method for controlling operation of an agricultural machine by voice control commands.

Referring to FIG. 2, a method for controlling operation of the agricultural machine 10 by voice control commands received in the portable device 1 is described. After provided the portable device 1 (step 100), a voice control command is received over the input device 2 of the portable device 1 (step 110). On the processing unit 3 of the portable device 1 a speech recognition software application is running. Different types of speech recognition applications are known as such in the art.

The speech recognition application is processing the voice control command, thereby, determining text data representing text information indicative of the voice control command (step 120). In a step 130, machine control signals assigned to a machine control function (function to control operation of at least one of the functional elements 12a, . . . , 12d) are provided in the control device 11 of the agricultural machine 10. Such providing of the machine control signals comprises steps of determining control function data indicating the machine control function from the command text data, and processing the control function data for generating the machine control signals. The operation of the agricultural machine 10 is controlled according to the machine control signals (step 140).

The determining of the control function data from the command text data may be performed in the portable device 1 or, as an alternative, in the agricultural machine 10. Similarly, the processing of the control function data for generating the machine control signals may be performed in the portable device 1 and/or in the agricultural machine 10.

Figure 3:
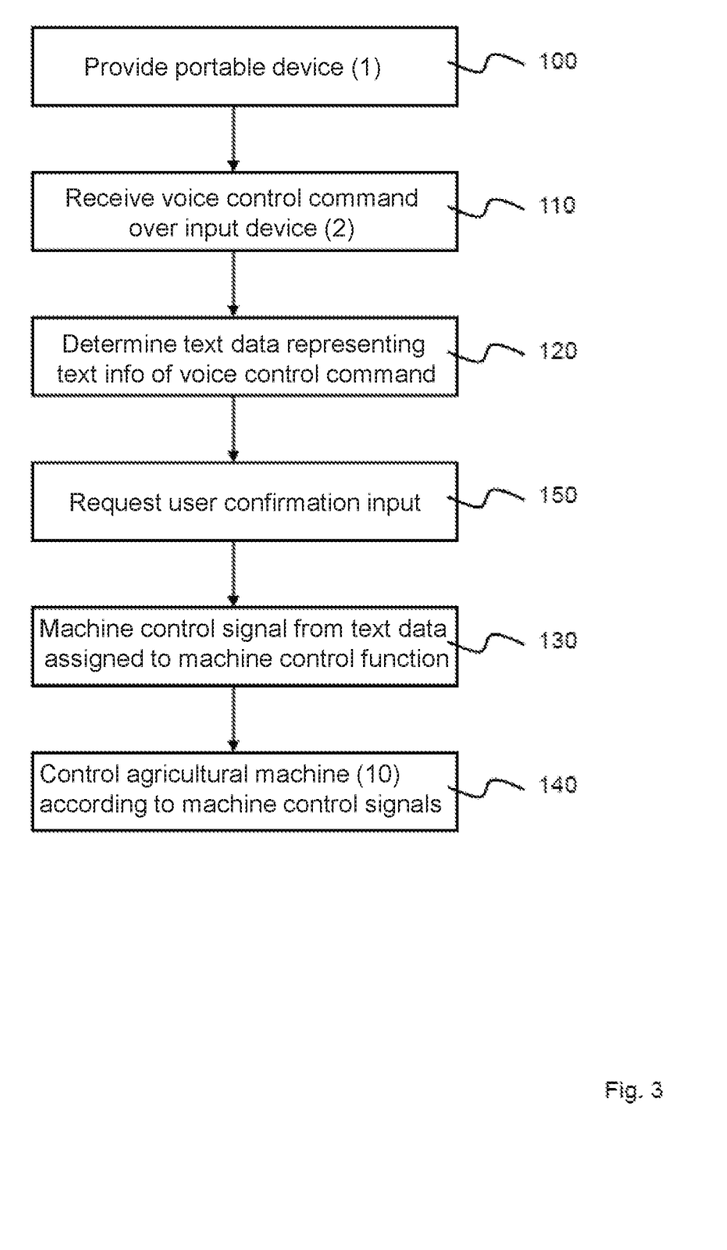
FIG. 3 depicts a schematic block diagram for another embodiment of a method for controlling operation of an agricultural machine by voice control commands.

FIG. 3 shows a schematic block diagram of another method for controlling operation of the agricultural machine 10 by voice control commands received in the portable device 1. In addition, there is requesting a user confirmation input (step 150). By receiving such user confirmation input in the portable device 1 it is confirmed that recognition of the voice control command received in the portable device 1 is done correctly. Only if such confirmation is received from the user or operator in the portable device 1, the providing of the machine control signals is started. Otherwise, the user may be requested to repeat the voice control command. Following, the steps for recognition of the voice control command are repeated.

Figure 4:
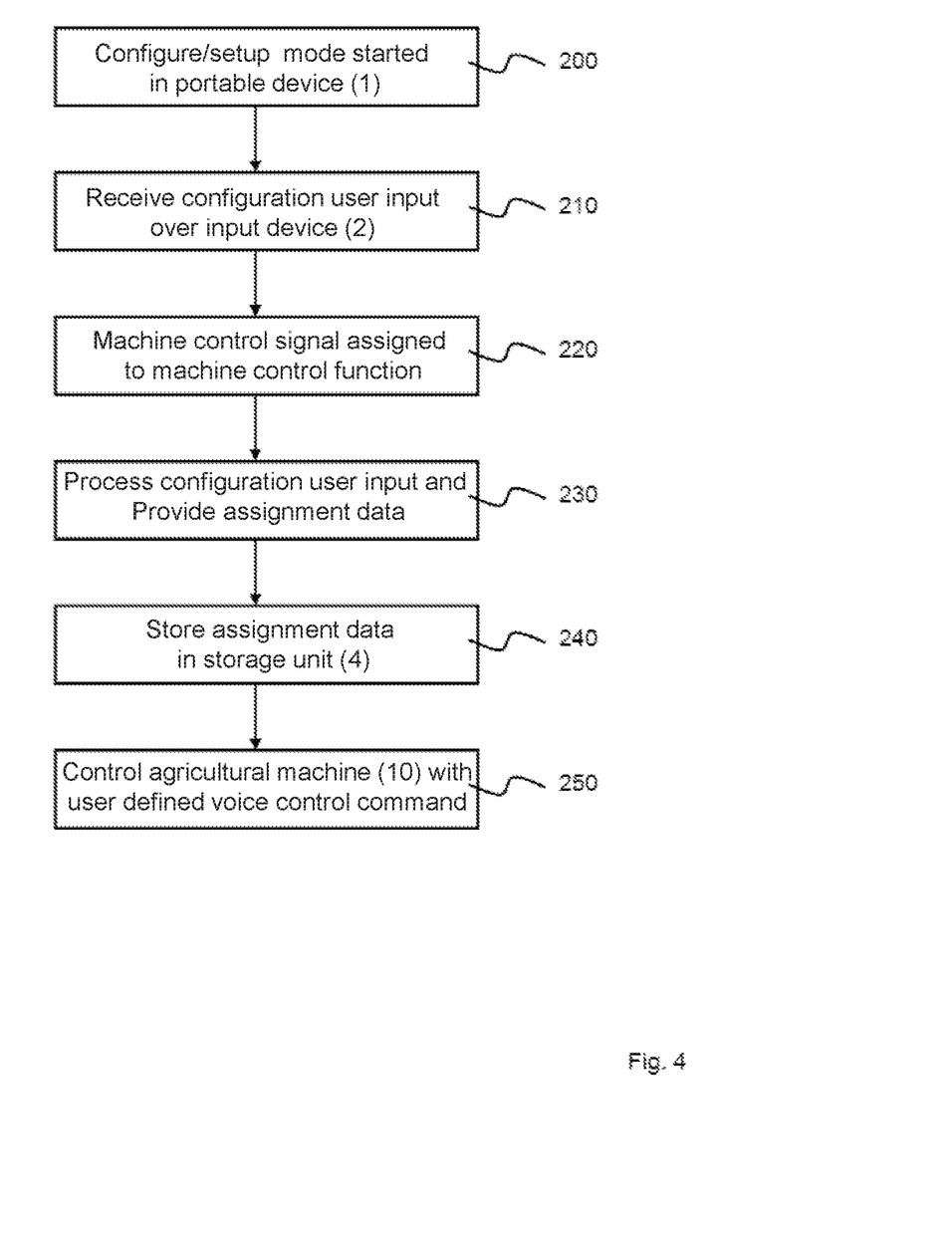
FIG. 4 depicts a schematic block diagram for an embodiment of a configuration mode of operation.

FIG. 4 shows a schematic block diagram with regard to a configuration or setup mode of operation in the portable device 1. Such configuration mode allows the user or operator of the agricultural machine 10 to implement user defined voice control commands, each of the user defined voice control commands being assigned to a machine control function of the agricultural machine 10.

In step 200 the configuration or setup mode of operation is started in the portable device 1. Audio and/or video information data are outputted over the output device 5 of the portable device 1. The audio and/or video information data are representing information about the machine control function to which a voice control command is to be assigned. Over the input device 2 of the portable device 1, a configuration user input is received (step 210). The configuration user input comprises a voice control command which may be different from a voice control command assigned to the machine control function before. In step 220 the voice control command is assigned to the machine control function. The assigning, in step 230, comprises processing the configuration user input and providing assignment data indicative of the assignment of the voice control command to the machine control function in the processing unit 3 of the portable device 1. In step 240 the assignment data are stored in at least one of the storage unit 4 of the portable device 1 and a storage unit of the control device 11 of the agricultural machine 10. Following, the user defined voice control command may be used for controlling the operation of the agricultural machine 10 (step 250). The user defined a voice control command is automatically recognized by the speech recognition application in the portable device 1.

Various modifications and alterations may be made to the examples within the scope of the claims, and aspects of the different examples may be combined in different ways to achieve further examples. Accordingly, the true scope of the claims is to be understood from the entirety of the present disclosure in view of, but not limited to, the embodiments described herein.

It will be apparent to those skilled in the art that various modifications and variations can be made without departing from the spirit or scope of the claims.

What is claimed is:

1. A method for controlling operation of an agricultural machine, comprising:

providing a portable device, the portable device comprising an input device, a processing unit, a storage unit, an output device, and a transceiver device configured for wireless data transmission;

receiving a voice control command over a microphone device of the input device of the portable device;

determining command text data from the voice control command by processing the voice control command by a speech recognition application running on the processing unit of the portable device;

outputting the command text data over a display of the output device of the portable device;

outputting a request for a user input over the output device of the portable device;

in response to the outputting of the command text data and the request for the user input, receiving a user confirmation input confirming that the command text data were correctly determined from the voice control command;

providing machine control signals assigned to a machine control function in a control device of an agricultural machine located remotely from the portable device, the control device of the agricultural machine comprising a processing unit and a transceiver device configured for wireless data transmission wherein the providing of the machine control signals starts only if it is determined prior thereto that the user confirmation input was received, and wherein the providing of the machine control signals comprises:

determining control function data indicating the machine control function from the command text data, and processing the control function data for generating the machine control signals; and controlling the operation of the agricultural machine according to the machine control signals.

2. The method according to claim 1, further comprising:
outputting voice data over a speaker device of the output device, the voice data being a voice representation of the command text data;
outputting a request for a user input over the output device of the portable device;
in response to the outputting of the voice data and the request for the user input, receiving a user confirmation input confirming that the voice data correctly represent the voice control command; and
prior to providing the machine control signals, determining whether the user confirmation input was received.

3. The method according to claim 1, wherein the providing of the machine control signals comprises:
transmitting the command text data from the portable device to the control device of the agricultural machine by wireless data transmission;
in the control device of the agricultural machine, determining the control function data from the command text data; and
processing the control function data for generating the machine control signals in the control device of the agricultural machine.

4. The method according to claim 1, wherein the providing of the machine control signals comprises:
determining the control function data from the command text data in the processing unit of the portable device;
transmitting the control function data from the portable device to the control device of the agricultural machine by wireless data transmission; and
processing the control function data for generating the machine control signals in the processing unit of the control device of the agricultural machine.

5. The method according to claim 1, wherein the providing of the machine control signals comprises:
in the control unit of the portable device,
determining the control function data from the command text data in the control device of the portable device;
processing the control function data for generating the machine control signals in the processing unit of the portable device; and
transmitting the machine control signals from the portable device to the control device of the agricultural machine by wireless data transmission.

6. The method according to claim 1, further comprising:
starting a configuration mode of operation in the portable device;
outputting audio and/or video information data over the output device of the portable device, the audio and/or video information data representing information about the machine control function;
receiving a configuration user input over the input device of the portable device, the configuration user input comprising a new voice control command which is different from the voice control command and which, in a user defined configuration, is to be assigned to the machine control function;
assigning the new voice control command to the machine control function, the assigning comprising processing the configuration user input and providing assignment data indicative of the assignment of the new voice control command to the machine control function in the processing unit of the portable device; and
storing the assignment data in at least one of the storage unit of the portable device and a storage unit of the control device of the agricultural machine.

7. The method according to claim 6, wherein the receiving of the configuration user input comprises receiving at least one of a user voice input and a user text input over the output device of the portable device, and, if the user voice input is received, recording the user voice input in the portable device.

8. The method according to claim 7, wherein the recording of the user voice input further comprises mapping the recorded user voice input to a plurality of standard voice user inputs and selecting one of the standard voice user inputs for the recorded user voice input.

9. The method according to claim 7, further comprising:
determining user command text data from the user voice input by processing the user voice input by the speech recognition application running on the processing unit of the portable device;
outputting the user command text data over a display of the output device of the portable device;
outputting a request for a user input over the output device of the portable device;
in response to the outputting of the user command text data and the request for the user input, receiving a user confirmation input confirming that the user command text data were correctly determined from the user voice input; and
prior to assigning the new voice control command to the machine control function, determining whether the user confirmation input was received.

10. The method according to claim 7, further comprising:
generating translated voice data by a text-voice translation application running on the processing unit of the portable device, the translated voice data being a voice representation of the user text input;
outputting the translated voice data over the speaker device of the output device;
outputting a request for a user input over the output device of the portable device;
in response to the outputting of the translated voice data and the request for the user input, receiving a user confirmation input confirming that the translated voice data were correctly generated from the user text input; and
prior to providing the machine control signals, determining whether the user confirmation input was received.

11. The method according to claim 7, further comprising:
outputting the recorded user voice input over the speaker device of the output device;
outputting a request for a user input over the output device of the portable device;
in response to the outputting of the recorded user voice input and the request for the user input, receiving a user confirmation input confirming that the recorded user voice input is correctly recorded; and
prior to providing the machine control signals, determining whether the user confirmation input was received.

12. A system for controlling operation of an agricultural machine, comprising:
a portable device having an input device, a processing unit, a storage unit, an output device, and a transceiver device configured for wireless data transmission; and
the agricultural machine located remotely from the portable device, the agricultural machine comprises a processing unit and a transceiver device configured for wireless data transmission, wherein:

the input device is configured to receive a voice control command over a microphone device of the input device, the processing unit is configured to determine command text data from the voice control command by processing the voice control command by a speech recognition application running on processing unit, and the system is configured to:

output the command text data over a display of the output device of the portable device, output a request for a user input over the output device of the portable device, in response to the outputting of the command text data and the request for the user input, receive a user confirmation input confirming that the command text data were correctly determined from the voice control command, provide machine control signals assigned to a machine control function in the control device of the agricultural machine wherein the providing of the machine control signals starts only if it is determined prior thereto that the user confirmation input was received, and wherein the providing of the machine control signals comprises determining control function data indicating the machine control function from the command text data, and processing the control function data for generating the machine control signals, and control the operation of the agricultural machine according to the machine control signals.

* * * * *